United States Patent [19]
Fayyad et al.

[11] Patent Number: 6,115,708
[45] Date of Patent: Sep. 5, 2000

[54] METHOD FOR REFINING THE INITIAL CONDITIONS FOR CLUSTERING WITH APPLICATIONS TO SMALL AND LARGE DATABASE CLUSTERING

[75] Inventors: Usama Fayyad, Mercer Island, Wash.; Paul S. Bradley, Madison, Wis.

[73] Assignee: Microsoft Corporation, Redmond, Wash.

[21] Appl. No.: 09/034,834

[22] Filed: Mar. 4, 1998

[51] Int. Cl.$^7$ .................................................. G06F 17/30
[52] U.S. Cl. .......................... 707/6; 707/3; 707/4; 707/5
[58] Field of Search .................... 707/1, 2, 5, 6, 707/104, 3, 4

[56] References Cited

U.S. PATENT DOCUMENTS

| | | | |
|---|---|---|---|
| 5,442,778 | 8/1995 | Pedersen et al. | 707/5 |
| 5,758,147 | 5/1998 | Chen et al. | 707/6 |
| 5,787,422 | 7/1998 | Tukey et al. | 707/5 |
| 5,832,182 | 11/1998 | Zhang et al. | 707/10 |
| 5,884,305 | 3/1999 | Kleinberg et al. | 707/6 |
| 5,920,856 | 7/1999 | Syeda-Mahmood | 707/3 |
| 5,930,784 | 7/1999 | Hendrickson | 707/2 |
| 5,983,224 | 11/1999 | Singh et al. | 707/6 |
| 6,012,058 | 1/2000 | Fayyad et al. | 707/6 |

OTHER PUBLICATIONS

J. Banfield and A. Patery, "Model–based Gaussian and Non–Gaussian Clustering", Biometrics, vol. 39: 803–821,pp 15–34, (1993).

P.S. Bradley, O.I. Mangasarian, and W.N. Street. 1997. Clustering via Concave Minimization, in Advances in Neural Information Processing systems 9, M.C. Mozer, M.I. Jordan, and T. Petsche (Eds.) pp. 368–374, MIT Press, (1997).

P. Cheeseman and J. Stutz, "Bayesian Classification (AutoClass): Theory and Results", in [FPSU96], pp. 153–180. MIT Press, (1996).

A. P. Dempster, N.M. Laird, and D. Rubin, "Maximum Likelihood From Incomplete Data Via the EM Algorithm". Journal of the Royal Statistical Society, Series B, 39(1):pp. 1–38, (1977).

U. Fayyad, D. Haussler, and p. Stolorz. "Mining Science Data." Communications of the ACM 39(11), (1996).

D. Fisher. "Knowledge Acquisition via Incremental Conceptual Clustering". Machine Learning, 2:139–172, (1987).

E. Forgy, "Cluster Analysis of Multivariate Data: Efficiency vs. Interpretability of Classifications", Biometrics 21:768. (1965).

(List continued on next page.)

*Primary Examiner*—John E. Breene
*Assistant Examiner*—Greta L. Robinson
*Attorney, Agent, or Firm*—Watts, Hoffman, Fisher & Heinke, Co., L.P.A.

[57] ABSTRACT

As an optimization problem, clustering data (unsupervised learning) is known to be a difficult problem. Most practical approaches use a heuristic, typically gradient-descent, algorithm to search for a solution in the huge space of possible solutions. Such methods are by definition sensitive to starting points. It has been well-known that clustering algorithms are extremely sensitive to initial conditions. Most methods for guessing an initial solution simply make random guesses. In this paper we present a method that takes an initial condition and efficiently produces a refined starting condition. The method is applicable to a wide class of clustering algorithms for discrete and continuous data. In this paper we demonstrate how this method is applied to the popular K-means clustering algorithm and show that refined initial starting points indeed lead to improved solutions. The technique can be used as an initializer for other clustering solutions. The method is based on an efficient technique for estimating the modes of a distribution and runs in time guaranteed to be less than overall clustering time for large data sets. The method is also scalable and hence can be efficiently used on huge databases to refine starting points for scalable clustering algorithms in data mining applications.

26 Claims, 5 Drawing Sheets

OTHER PUBLICATIONS

Jones, "A Note on Sampling From a Tape File". Communications of the ACM, vol. 5, (1962).

S. Z. Selim and M.A. Ismail, "K–Means–Type Algorithms: A Generalized Convergence Therorem and Characterization of Local Optimality." IEEE Trans. on Pattern Analysis and machine Intelligence, vol. PAMI–6, No. 1, (1984).

T. Zhang, R. Ramakrishnan, and M. Livny. "BIRCH: A new Data Clustering Algorithm and its Applications", Data Mining and knowledge Discovery, vol. 1, No. 2, (1997).

Radford M. Neal and Geoffrey E. Hinton, A View of the Em Algorithm That Justifies Incremental, Sparse and Other Variants, (date unknown).

Bo Thiesson, Christopher Meek, David Maxwell Chickering and David Heckerman, "Learning Mixtures of DAG Models" Technical Report MSR–TR–97–30 Dec. (1997), Revised May 1998).

× TRUE SOLUTION
A's: SOLUTIONS FROM TRIAL 1
B's: SOLUTIONS FROM TRIAL 2
C's: SOLUTIONS FROM TRIAL 3
D's: SOLUTIONS FROM TRIAL 4

METHOD FOR REFINING THE INITIAL CONDITIONS FOR CLUSTERING WITH APPLICATIONS TO SMALL AND LARGE DATABASE CLUSTERING

FIELD OF THE INVENTION

The present invention concerns clustering of data and more particularly concerns method and apparatus for optimizing a starting condition for the clustering of data.

BACKGROUND ART

Data clustering is important in a variety of fields including data mining, statistical data analysis, data compression, and vector quantization. Clustering has been formulated in various ways in the machine learning, pattern recognition, optimization, and statistics literature. The general agreement is that the problem is about finding groups (clusters) in data that consist of data items which are similar to each other. The most general definition of the clustering problem is to view it as a density estimation problem. The value of the hidden cluster variable (the cluster ID) specifies the model from which the data items that belong to that cluster are drawn. Hence the data is assumed to arrive from a mixture model and the mixing labels (cluster identifiers) are hidden.

In general, a mixture model M having K clusters Ci, i=1 . . . , K, assigns a probability to a data point x as follows:

$$Pr(x|M) = \sum_{i=1}^{K} W_i \cdot Pr(x|Ci, M)$$

where $W_i$ are called the mixture weights. The problem of clustering is identifying the properties of the clusters Ci. Usually it is assumed that the number of clusters K is known and the problem is to find the best parameterization of each cluster model. A popular technique for estimating the parameters is the EM algorithm.

There are various approaches to performing the optimization problem of finding a good set of parameters. The most effective class of methods is known as the iterative refinement approach. The basic algorithm goes as follows:

1. Initialize the model parameters, producing a current model.
2. Decide memberships of the data items to clusters, assuming that the current model is correct.
3. Re-estimate the parameters of the current model assuming that the data memberships obtained in 2 are correct, producing new model.
4. If the current model and new model are sufficiently close to each other, terminate, else go to 2.

As an example a so-called K-Means clustering evaluation starts with a random choice of cluster centroids or means for the clusters. In a one dimensional problem this is a single number for the average of the data points in a given cluster but in an n dimensional problem, the mean is a vector of n components. Data items are gathered and are assigned to a cluster to based on the distance to the cluster centroid. Once the data points have been assigned the centroids are recalculated and the data points are again reassigned. Since the centroid location (in n dimensions) will change when the centroids are recalculated (recall they were randomly assigned the first iteration and its unlikely they are correct) some data points will switch centroids. The centroids are then again calculated. This process terminates when the assignments and hence centroids cease to change. The output from the K-means clustering process is K centroids and the number of data points that fall within a given centroid.

The present invention is concerned with step 1: the initialization step of choosing the starting centroids.

The most widely used clustering procedures in the pattern recognition and statistics literature are members of the above family of iterative refinement approaches: the K-means algorithm, and the EM algorithm. The difference between the EM and K-means is essentially in the membership decision in step 2. In K-means, a data item is assumed to belong to a single cluster, while in the EM procedure each data item is assumed to belong to every cluster but with a different probability. This of course affects the update step (3) of the algorithm. In K-means each cluster is updated based strictly on its membership. In EM each cluster is updated by the entire data set according to fractional memberships determined by the relative probability of membership.

Note that given the initial conditions of step 1, the algorithm is deterministic and the solution is determined by the choice of an initial or starting point. In both K-means and EM, there is a guarantee that the procedure will converge after a finite number of iterations. Convergence is to a local minimum of the objective function (likelihood of the data given the model) and the particular local minimum is determined by the initial starting point (step 1). It has been well-known that clustering algorithms are extremely sensitive to initial conditions. Most methods for guessing an initial solution simply pick a random guess. Other methods place the initial means or centroids on uniform intervals in each dimension. Some methods take the mean of the global data set and perturb it K times to get the K initial means, or simply pick K random points from the data set. In most situations, initialization is done by randomly picking a set of starting points from the range of the data.

In the above clustering framework, a solution of the clustering problem is a parameterization of each cluster model. This parametrization can be performed by determining the modes (maxima) of the joint probability density of the data and placing a cluster at each mode. Hence one approach to clustering is to estimate the density and then proceed to find the "bumps" in the estimated density. Density estimation using some technique like kernel density estimation is difficult, especially in high-dimensional spaces. Bump hunting is also difficult to perform.

The K-means clustering process is a standard technique for clustering and is used in a wide array of applications in pattern recognition, signal processing, and even as a way to initialize the more expensive EM clustering algorithm. The K-means procedure uses three inputs: the number of clusters K, a set of K initial starting points, and the data set to be clustered. Each cluster is represented by its mean (centroid). Each data item is assigned membership in the cluster having the nearest mean to it (step 2). Distance is measured by the Euclidean distance (or L2 norm).

For a data point (d-dimensional vector) x and mean $\mu$, the distance is given by:

$$Dist(x, u) = \sqrt{\sum_{i=1}^{d} (x_i - u_i)^2}$$

A cluster model is updated by computing the mean of its members (step 3).

To specify the algorithm in the framework introduced so far we need to describe the model used. The model at each cluster is assumed be a Gaussian. For each cluster, the Gaussian is centered at the mean of the cluster. It is assumed to have a diagonal covariance with constant entries on the diagonals of all the clusters. Note that a harsh cluster membership decision for a data point leads to assigning a point to the nearest cluster (since in this case the Euclidean distance is proportional to probability assigned to the point by the cluster). Finally, the mixture weights ($W_i$) in K-means are all assumed equal.

Note that by this definition, K-means is only defined over numeric (continuous-valued) data since the ability to compute the mean is a requirement. A discrete version of K-means exists and is sometimes referred to as harsh EM.

SUMMARY OF THE INVENTION SUMMARY OF THE INVENTION

The present invention concerns a method and apparatus that adjusts the initial starting point to a point that is likely to be nearer to modes of the data distribution. Of course, this is what clustering itself is about, so the challenge is to perform this starting point determination without requiring as much work as clustering.

An exemplary embodiment of the invention includes the steps of iteratively obtaining a multiple number of data portions from a database stored on a storage medium and performing clustering on each of these relatively small data portions to provide a multiple number of clustering solutions. These clustering solutions are considered as a set of candidate starting points from which a "best starting point" is to be derived for the full clustering analysis that is then performed.

The process of choosing which of the clustering solutions to use as a starting point involves an additional analysis of the multiple solutions. In an exemplary embodiment of the invention the multiple clustering solutions from the initial data samples are each chosen as a starting point for a clustering of all the candidate solutions. A "best" solution is derived from this second set of clusterings. The best solution is returned as the refined (improved) starting point to be used in clustering the full data set.

These and other objects are advantages and features of the invention and will be described in conjunction with an exemplary embodiment of the invention which is described in conjunction with the accompanying drawings.

BRIEF DESCRIPTION OF THE DRAWINGS

FIG. 8, which comprise

DETAILED DESCRIPTION OF EXEMPLARY EMBODIMENT OF THE INVENTION

Figure 1:
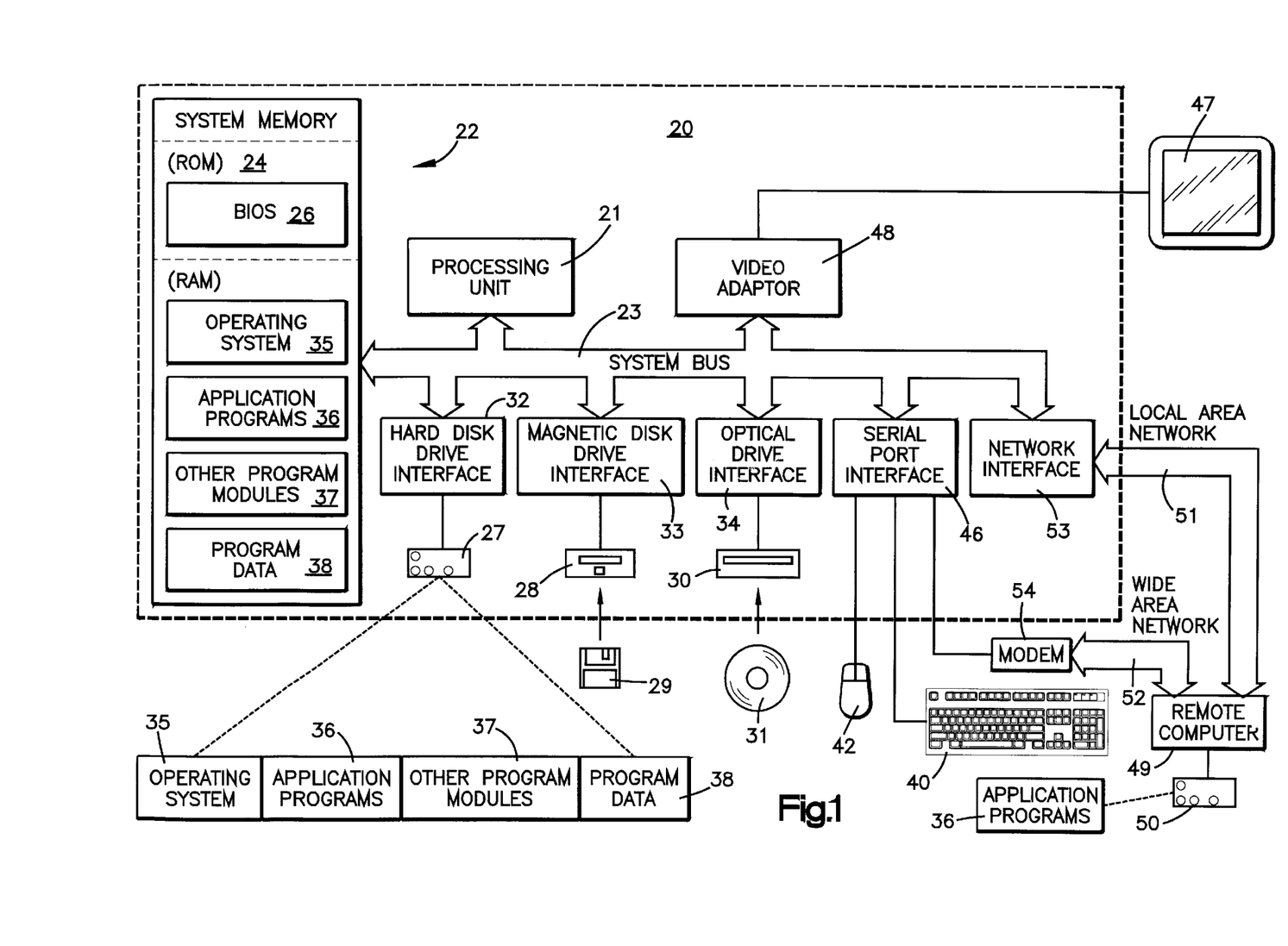
FIG. 1 is a schematic depiction of a computer system used in implementing the present invention.

With reference to FIG. 1 an exemplary data processing system for practicing the disclosed data clustering analysis includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 3:
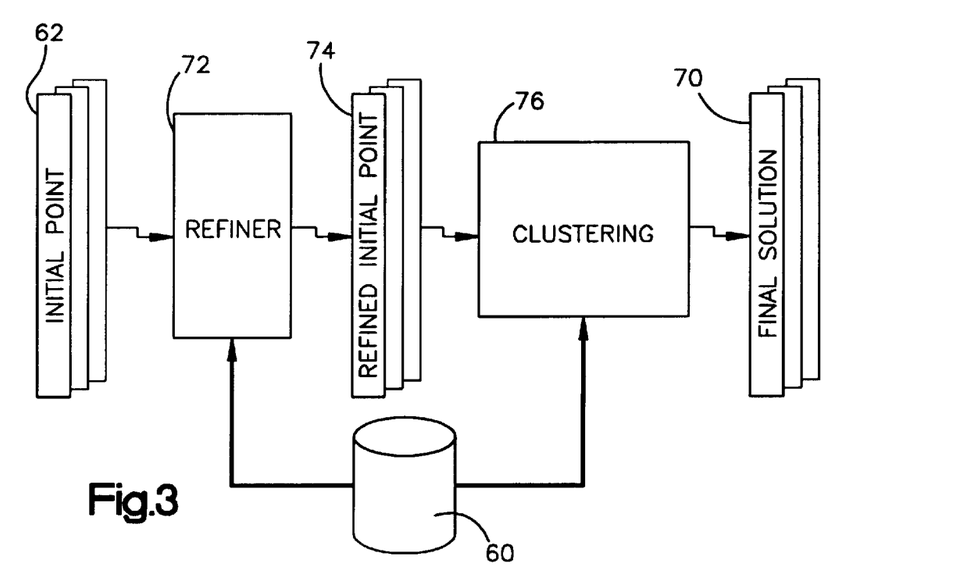
FIG. 3 is a schematic of clustering components used for evaluating data from a database.

FIG. 3 presents an overview of the processing components used in clustering data. These processing components perform data clustering on a data set or database 60 of records stored on a storage medium such as the computer system's hard disk drive 27. The data records typically are made up of a number of data fields or attributes. For example, a marketing database might contain records with attributes chosen to illustrate a purchasers buying power, past tastes and presents needs with one record for each purchaser.

The components that perform the clustering require three inputs: the number of clusters K, a set of K initial starting points 62, and the data set 60 to be clustered. The clustering of data by these components produces a final solution 70 as an output. Each of the K clusters of this final solution 70 is represented by its mean (centroid) where each mean has d components equal to the number of attributes of the data records.

A refinement component 72 produces 'better' starting points 74 based on a limited sampling of data from the data set 60 to be clustered. Since the entire clustering process can be viewed as a "refinement of a starting point", the refinement component 72 must run in significantly less time than the overall clustering that is performed by a clustering component 76 that utilizes the refined starting points 74 to provide the clustering solution 70.

A most favorable refined starting point produced by the refinement component 72 would be to move the set of starting points 62 to a set of refined points 74 that are closer to the modes of the data distribution. This appears to be as difficult a problem as the problem of clustering the data (or density estimation) itself. What is needed is a "cheap" method of making an approximate guess at where the modes are. An exemplary embodiment of the invention makes a rough guess based on a small sample of the data from the database 60. The intuition here is that severely subsampling data will naturally bias the sample to have representatives only from the modes This subsampling cannot, however, guard against the possibility of points from cluster tails being sampled. Such data would give a very skewed view of the data.

Figure 4A:
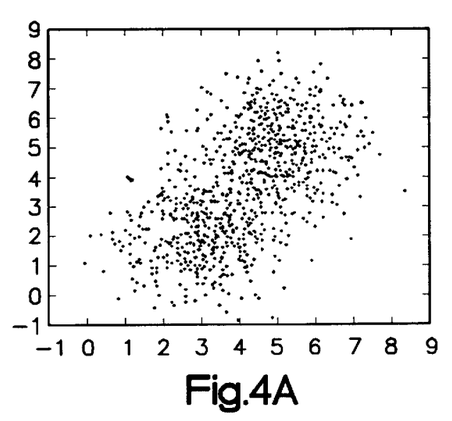
FIGS. 4A and 4B are two-dimensional depictions showing a full sample of data and a subsample of that same data to illustrate the intuition behind our method for homing in efficiently on the likely modes of the data distribution.
Figure 4B:
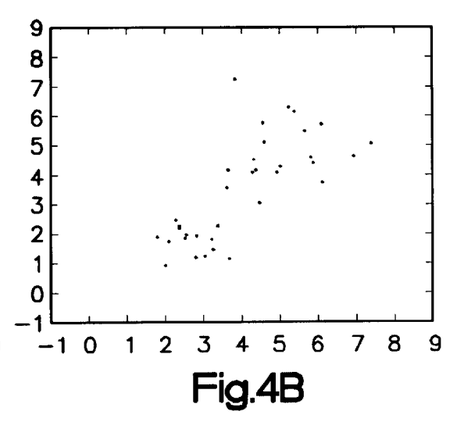

FIGS. 4A and 4B illustrate the fact that subsampling the data emphasizes the modes. These two figures show data drawn from a source containing two Gaussians (clusters) in 2 dimensions. FIG. 4A shows a given data sample, while FIG. 4B illustrates what a randomly drawn very small subsample looks like. Each of the points in FIG. 4B may be thought of as a "guess" for the possible location of a mode in the underlying distribution. The estimates are fairly varied, but they exhibit "expected" behavior. The subsampling produces a good separation between the two clusters.

The invention performs a clustering on the small sample (FIG. 4B) and then uses the result of such clustering to produce the refined starting point 74. This solution still exhibits noisy estimates due to small samples, especially in skewed distributions in databases having high dimensions.

Figure 5A:
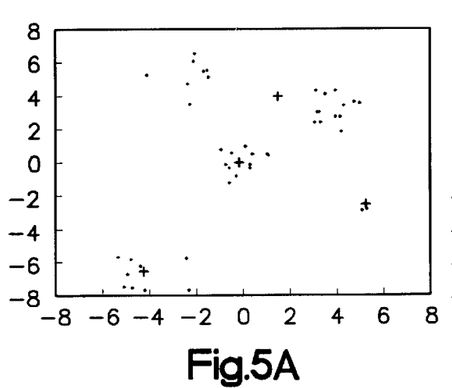
FIGS. 5A and 5B are two-dimensional depictions of two clustering results on two data samples from the same database to illustrate the sensitivity of the K-means clustering algorithm to choice of random sample given the same starting condition.
Figure 5B:
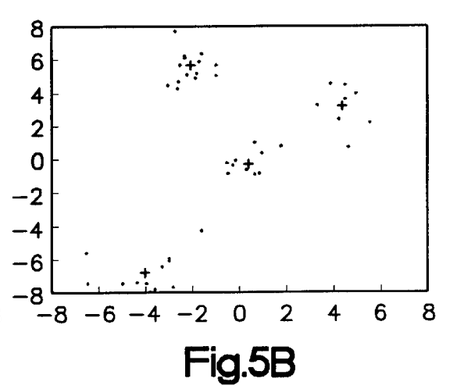

FIGS. 5A and 5B show the result of clustering two different subsamples drawn from the same distribution, and initialized with the same starting point. Cluster centroids are designated with a '+' on these Figures. The variance in result illustrated by these depictions is fairly common even in low dimensions using data from well-separated Gaussians. These figures also illustrate the importance of the problem of having a good initial or starting point. Each of the two data clusters depicted in FIGS. 5A and 5B depict clustering from 2 different samples of the same size that were obtained from the same database.

FIG. 5A also illustrates another fairly common phenomenon with K-means clustering: some of the clusters may remain empty or have only single outlier points causing the other clusters to have worsened means (cluster centers).

Clustering the Solutions

Figure 2:
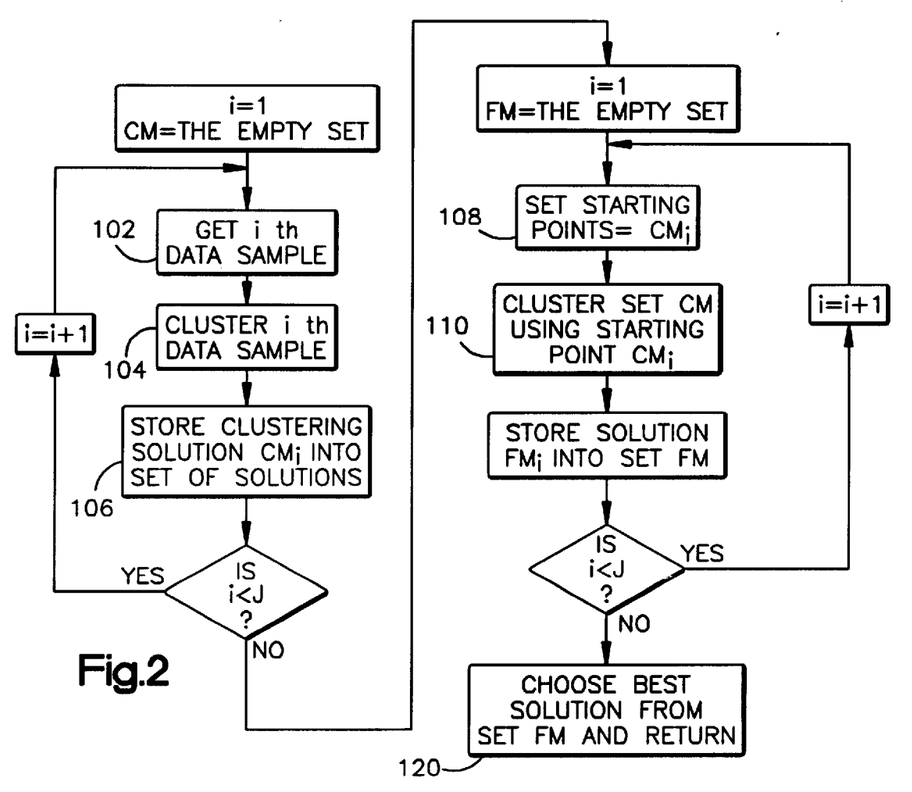
FIG. 2 is a flow chart depicting of a process of choosing a clustering starting point.
Figure 7:
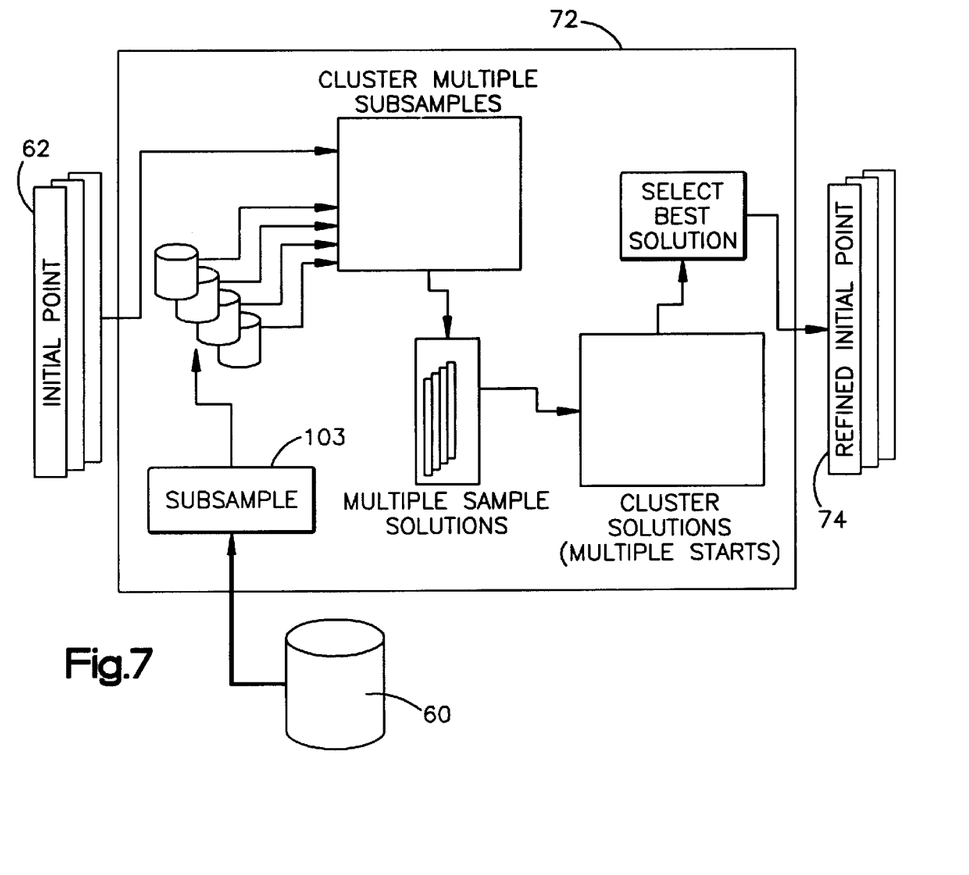
FIG. 7 is a schematic depiction of the refinement method of this invention in accordance with an exemplary embodiment of the invention for clustering components used in evaluating data from a database.

The refinement component 72 of FIG. 7 functions in accordance with the flow chart of FIG. 2 and addresses the problem of noisy estimates. In accordance with the disclosed embodiment of the invention, the refinement component 72 of FIG. 3 obtains 102 multiple subsamples 103, and each such subsample is clustered 104 separately. This is done iteratively producing a total of J solutions which are viewed as J candidate starting initial points.

As illustrated in the FIG. 2 flowchart, these multiple solutions are then used to produce an optimum solution. One possible use of the multiple solutions would be take the superposition of the solution (e.g. the mean of the centroids obtained for each cluster) to reduce the J candidate starting points for a cluster to one candidate point. However, to perform this superposition or averaging, one needs to first solve a correspondence problem: decide a partition on the J solutions (recall each of the J solutions consists of K points) such that the J points in each block of the K-partition belong together. This is illustrated in FIG. 6.

Figure 6:
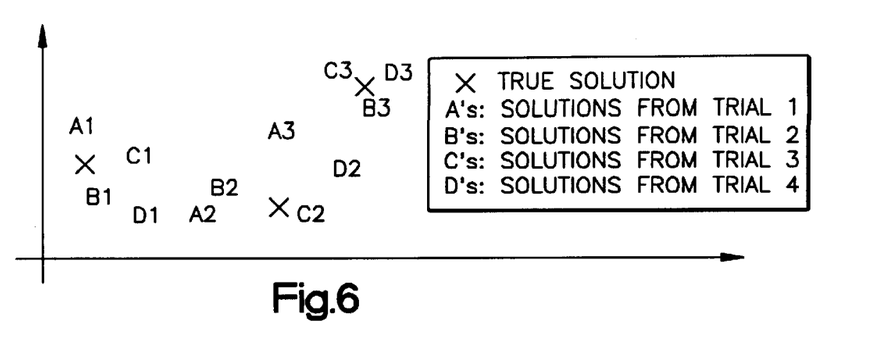
FIG. 6 is a two-dimensional depiction of multiple solutions to a clustering of a small subsets of data from a database to illustrate why a second clustering of the cluster solutions is needed.

FIG. 6 shows four solutions obtained for K=3, J=4. Suppose that the "true" solution to the problem is where the X's are shown in FIG. 6. The A's show the 3 cluster centroids obtained from the first sample, B's second, C's third, and D's fourth. The problem is how do you know that D1 is to be grouped with A1 but A2 does not also go with that group?

Practice of the invention utilizes clustering as a way to solve this correspondence problem. Returning to FIG. 2, the starting point 74 is derived from a clustering 110 of the J solutions 106 to assess the correspondence. This can be viewed as a special form of voting scheme to combine solutions.

Practice of the invention utilizes clustering as a way to solve this correspondence problem. Returning to FIG. 2, the starting point is derived from a clustering 110 of the solutions 104 to assess the correspondence. This can be viewed as a special form of voting scheme to combine solutions. Psuedo-code for the FIG. 2 flowchart is as follows:

```
Algorithm Refine(SP, Data, K, J)
    0. CM = φ
    1. For i=1, . . ., J
        a. Let Sᵢ be a small random subsample of Data
        b. Let CMᵢ = KMeans_Mod(SP, Sᵢ, K)
        c. CM = ∪ CMᵢ
    2. FMS = φ
    3. For i=1, . . ., J
        a. Let FMᵢ = KMeans(CMᵢ, CM, K)
        b. Let FMS = FMS ∪ FMᵢ
    4. Let FM = ArgMin{Distortion(FMᵢ, CM)}
                  FMᵢ
    5. Return (FM)
```

The above algorithm utilizes three calls: Kmeans( ), KMeansMod( ) and Distortion(). The function KMeans is a call to the K-means clustering procedure described previously which takes as arguments: a starting point, a data subset, and the number of clusters K.

KmeansMod() is a slightly modified version of K-means, and takes exactly the same arguments as Kmeans(). The modification is as follows: If at the end of the clustering process, any of the clusters have zero membership, then the corresponding initial guess at this cluster centroid is set to the data point farthest from its assigned cluster center. This procedure decreases the likelihood of having empty clusters after reclustering from the "new" initial point. Resetting the empty centroids to another point may be done in a variety of ways. In accordance with an exemplary embodiment, an empty centroid is mapped to the data point having farthest distance to its corresponding mean. However, other methods are contemplated including: picking a random point from the data, picking a new point consisting of the mean of the entire data set, picking the mean of the entire data set but perturing that mean by a small random amount corresponding to a variance in the data mean in each dimension.

Choosing a best solution 120 is determined by the distortion function. This function measures the degree of fit of a set of clusters to the given data set. This is simply the sum of distance-squared between each data point and the center of the cluster to which it is assigned. It can be shown formally that K-means, viewed as an optimization technique, lands on local minima in this objective function.

Assume that 100 iterations (J=100, FIG. 2) of data sampling are performed at the step 102 of FIG. 2. This produces 100 solutions. Assume also that the original clustering of the samples was performed using K=cluster number=5. The solutions are five d dimensional vectors (d=attritubutes in a data record for example). At a step 108 each of the 100 solutions $CM_i$ found at the step 104 is used as a starting point in clustering all the 100 solutions. Recall that to initialize the K-means clustering, we need a starting condition consisting of K initial points. So for example, solution #1 (which consists of K cluster centroids) can be used in a straight-forward manner to cluster the "data set" consisting of all 100 solutions (this "data set" has 100 * K points in it since each solution consists of K cluster centroids). The first centroid vector of cluster #1 is used as a starting point to cluster all 100 * K vectors resulting from putting all the solutions together. Next repeat the clustering using the K centroids of solution #2 as starting points to cluster the same 100 * K points, and so forth. Each of these 100 clusterings of the set of solutions results in a set of K centroids. At the step 120 the refinement component 72 chooses the result that has the minimal distortion over the set of 100 * K data points. The $FM_i$ that produces this best result is chosen as the refined starting point for clustering by the clustering component 76 of FIG. 3.

This refinement process is illustrated in the diagram of FIG. 7 where multiple solutions are shown and are used during an additional clustering step to produce the best starting point. The discussion on clustering the 100 * K data set is an example of the second clustering step.

The invention contemplates alternatives to this exemplary process for choosing the best refined starting point. These alternates include:

1. Pick the solution from $CM_i$ that had best distortion from the first set of data wherein 'best' is taken as the distortion over all the points that are sampled for all J iterations. This will bypass the secondary clustering.
2. Do a correspondence between cluster centroids of the solutions (i.e. map each solution in each of the 100 clusterings to its corresponding centroid in all the others) then pick a final solution by taking: a. centroids of each cluster (direct average), and b. a statistical voting scheme, some modified robust estimation method that is less sensitive to outliers. (note in the exemplary embodiment of the invention the second clustering stage deals with this "matching" problem efficiently).

Scaling to Large Databases

The invention can be used as a preprocessor to any clustering algorithm simply by refining the starting point prior to clustering. However, as a database size increases, especially its dimensionality, efficient and accurate initialization becomes critical. A clustering session on a data set with many dimensions and tens of thousands or millions of records can take hours or days.

Since the data samples are small, the refinement step runs very fast. For example, if 1% or less of the data is sampled, the invention can run trials over 10 samples in time complexity that is less than 10% of the time it will take the full clustering. In fact if the user is willing to spend as much time refining the means as is needed to run the clustering problem, then many more samples can be processed. In general, the time it takes to cluster a data set is proportional to its size. There is a factor that multiplies this complexity which has to do with the number of iterations required by the clustering algorithm.

If for a data set D, a clustering algorithm requires Iter(D) iterations to cluster it, then time complexity is |D| * Iter(D). A small subsample S⊆D, where |S|<<|D|, typically requires significantly fewer iteration to cluster. Empirically, it is safe to expect that Iter(S)<Iter(D). Hence, given a specified budget of time that a user allocates to the refinement process, simply determine the number J of subsamples to use in the refinement process. When |D| is very large, and |S| is a small proportion of |D|, refinement time is essentially negligible, even for large J.

Another desirable property of practice of the invention is that it easily scales to very large databases. Since the only requirement is to able to hold a small sample in memory and solutions computed over previous small samples, the algorithm can run with a small buffer of RAM and can be used on huge databases. Of course, we assume that it is possible to obtain a random sample from a large database. This may not be straightforward. Unless one can guarantee that the records in a database are not ordered by some property, random sampling can be as expensive as scanning the entire database. Note that in a database environment, what one thinks of as a data table (i.e. the entity familiar to machine learning researchers) may not exist as a physical table in a database. It can be a result of a query which involves joins, groupings, and sorts. In many cases this imposes special ordering on the result set, and randomness of the data view cannot be assumed.

Example Data

Figure 8A:
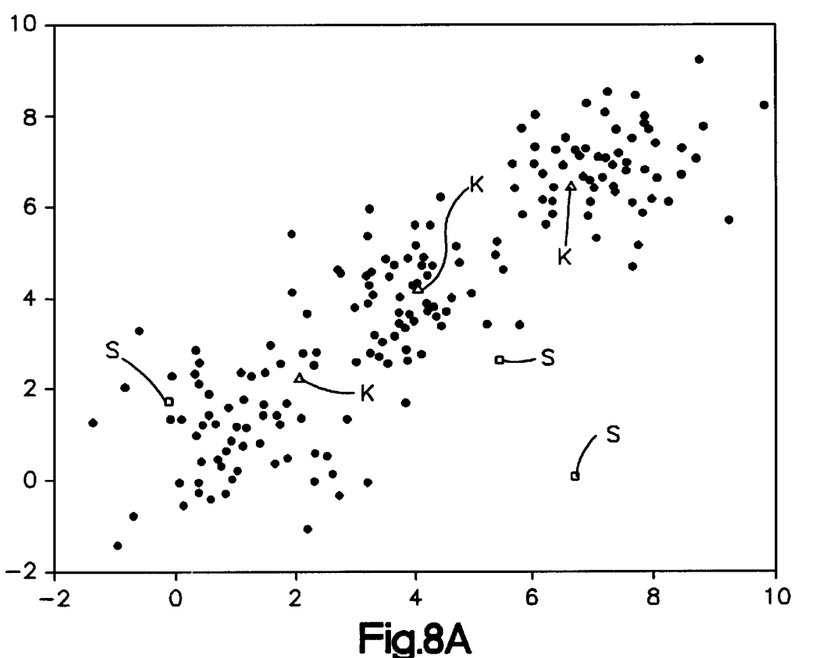
FIGS. 8A and 8B, depicts two clustering solutions, one of which is the result of randomly assigning a starting point and a second of which uses a refined starting point as depicted in FIG. 7. Note how the refined starting point leads to the optimal clustering solution in this case, while the random starting point leads to a bad solution.
Figure 8B:
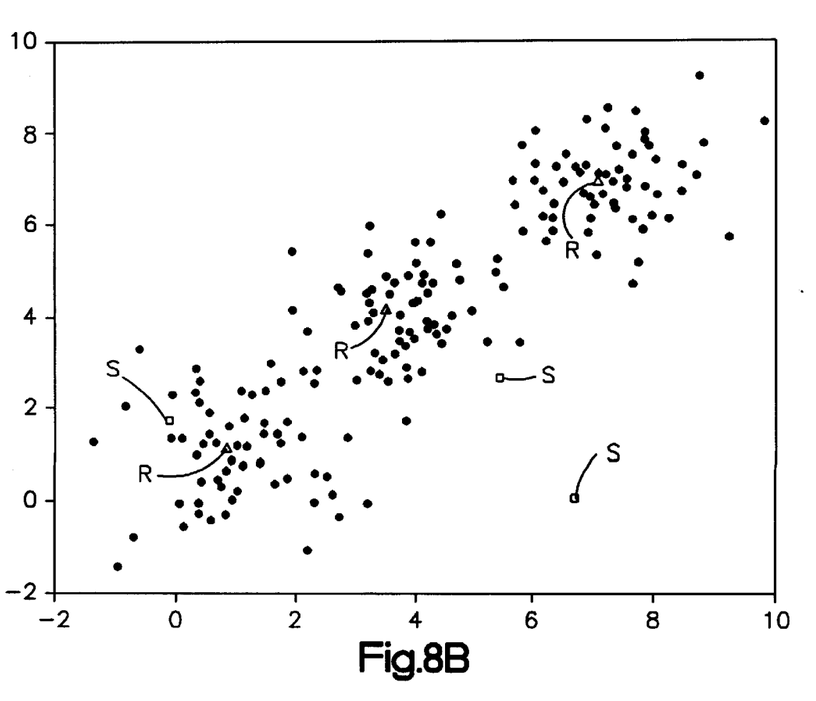

To illustrate how K-means is sensitive to initial conditions, consider the data shown in FIGS. 8A and 8B. FIG. 8A shows how K-means behaves from some random starting point. This data set shows three Gaussians in 2-D. Note that the Gaussians in this case happen to be centered along a diagonal. The reason for this choice is that even as the dimensionality of the data goes higher, then any 2-D projection of the the higher dimensional data will have this same form. This makes the data set easy for a visualization-based approach. Simply project the data to two dimensions, and the clusters reveal themselves. This is a rare property since if the Gaussians are not aligned with the main diagonal dimension axes, any lower-dimensional projection will result in overlaps and separability in 2-D is lost.

FIG. 8A shows use of random starting points (S) and the corresponding K-means solution centroids K. FIG. 8B shows the same initial random starting points (S) and the clustering centroid R using the disclosed refinement procedure. Note that in this case the refinement got us extremely close to the true solution. Running K-means from the refined point converges on the true solution.

It is important to point out that this example is for illustrative purposes only. The interesting cases are the higher-dimensional data sets from large database having much higher dimension (100 dimensions and more).

Other Clustering Algorithms

The refinement method discussed thus far have been in the context of the K-means algorithm. However, the invention can be generalized to other algorithms, and even to discrete data (on which means are not defined). If a given procedure A is being used to cluster the data, then A is also used to cluster the subsamples. The procedure A will produce a model. The model is essentially described by its parameters. The parameters are in a continuous space. The stage which clusters the clusters (i.e. step 3 of the above pseudo-code ) remains as is; i.e. we use the K-means algorithm in this step. The reason for using K-means is that the goal at this stage is to find the "centroid" of the models, and in this case the harsh membership assignment of K-means is desirable. The generalized algorithm is given as follows:

---

Algorithm Generalized_Refine(SP, Data, K, J)
    0. CM = φ
    1. For i=1, . . ., J
        a. Let $S_i$ be a small random subsample of Data
        b. Let $CM_i$ = Cluster(SP, $S_i$, K)
        c. CM = CM ∪ $CM_i$ -continued     2. FMS = φ
    3. For i=1, . . ., J
        a. Let $FM_i$ = KMeansPrime($CM_i$, CM, K)
        b. Let FMS = FMS ∪ $FM_i$
    4. Let FM = $\mathrm{ArgMin}_{FM_i}$ {Distortion($FM_i$, CM)}
    5. Return (FM)

---

Note that the only differences are that step 1.e calls some other clustering algorithm (ClusterA), and that step 3.a now uses KmeanPrime( ) which is defined to cluster model parameters rather than data vectors. The difference here is that model parameters may be matrices rather than simple vectors. This generalization only involves defining the appropriate distance metric.

For example, assume the user is clusterng using the EM algorithm and that data is discrete, and hence each cluster specifies a multinomial distribution over the data. A multinomial distribution has a simple set of parameters: for every attribute, a vector of probabilities specified the probabilities of each value of the attribute given the cluster. Since these probabilities are continuous quantities, they have a "centroid" and K-means can be applied to them.

While the present invention has been described with a degree of particularity, it is the intent that the invention include all alterations or modifications from the exemplary design falling within the spirit or scope of the appended claims.

We claim:

1. A method for evaluating data in a database that is stored on a storage medium, wherein the database has a data set to be evaluated, and wherein the data set is comprised of a plurality of records, comprising the steps of:

a) obtaining a multiple number of data subsets comprising a plurality of records from the data set,     b) performing clustering analysis on the data records that make up each of the subsets to provide a multiple number of candidate clustering starting points;

c) choosing one of the multiple candidate clustering starting points to be used in clustering the data set to be evaluated; and     d) using the one chosen candidate clustering starting point as a starting point to perform clustering analysis on the data set to be evaluated.

2. The method of claim 1 wherein the step of performing clustering analysis on each of the subsets is performed from an initial starting point which is refined to determine said candidate clustering starting point.

3. The method of claim 1 wherein the step of choosing one of the candidate clustering starting points comprises the step of performing additional data clustering on the multiple number of candidate clustering starting points.

4. The method of claim 1 wherein the step of choosing one of the candidate clustering starting points comprises the step of performing additional data clustering on the multiple number of candidate clustering starting points and wherein one of said multiple number of candidate clustering starting points is chosen as a refined clustering starting point to perform the data clustering.

5. The method of claim 2 wherein the initial starting point is randomly determined.

6. The method of claim 2 wherein the step of performing clustering analysis on each of the subsets is performed by removing sparsely populated clusters, merging the sparsely populated clusters with clusters that are more densely populated and determining a new initial starting point for subsequent clustering of data.

7. The method of claim 2 wherein if at the end of the clustering of each of the subsets, any of the clusters have zero membership, then the corresponding initial choice for this empty cluster centroid is adjusted to a solution set to a data point in the sample farthest from the initial choice that resulted in the empty cluster.

8. The method of claim 2 wherein if at the end of the clustering of each of the subsets any of the clusters have zero membership a new cluster mean for the empty cluster is chosen from the mean of the entire data sample.

9. The method of claim 2 wherein if at the end of the clustering the data records that make up each of the subsets, any of the clusters have zero membership a new cluster mean for the empty cluster is chosen by picking the mean of the entire data set and perturbing that mean by a small random amount corresponding to a variance in the data mean in each dimension of the data sample.

10. The method of claim 1 wherein the step of performing a clustering analysis on each of the subsets uses a different clustering process than the clustering process that is used to perform clustering analysis on the data set to be evaluated.

11. In a computer data mining system, apparatus for evaluating data in a database comprising:
   a) one or more data storage devices for storing a database of records on a storage medium;
   b) a computer having an interface to the storage devices for reading data from the storage medium and bring the data into a rapid access memory for subsequent evaluation; and
   c) said computer comprising a processing unit for evaluating at least some of the data in the database and for clustering the data into multiple numbers of data clusters; said processing unit programmed to retrieve multiple subsets of data from the database, find multiple candidate clustering starting points from the multiple data subsets retrieved from the database and choosing an optimum solution from the multiple number of candidate clustering starting points to begin subsequent clustering on data in the database.

12. In a computer database system, a method for use in choosing starting conditions in a data clustering procedure comprising the steps of:
   a) choosing a cluster number K for use in categorizing the data in the database into K different data clusters;
   b) choosing an initial centroid for each of the K data clusters;
   c) sampling a portion of the data in the database from a storage medium and performing a clustering on the data sampled from the database based on the K centroids to form K characterizations of the database;
   d) repeating the sampling and clustering steps until a plurality of clustering solutions have been determined; and
   e) choosing a best solution from said plurality of clustering solutions to use as a starting point in further clustering of data from the database.

13. Apparatus for evaluating data in a database that is stored on a storage medium, wherein the database has a data set to be evaluated, and wherein the data set is comprised of a plurality of records, the apparatus comprising:
   a) means for obtaining a multiple number of data subsets comprising a plurality of records from the data set,
   b) means for performing clustering analysis on the data records that make up each of the subsets to provide a multiple number of candidate clustering starting points;
   c) means for choosing one of the multiple candidate clustering starting points to be used in clustering the data set to be evaluated; and
   d) means for using the chosen starting point to perform clustering analysis on the data set to be evaluated.

14. The apparatus of claim 13 additionally comprising means to randomly choose an initial starting point for use in clustering the multiple data subsets.

15. The apparatus of claim 13 additionally comprising means to choose an initial starting point for use in performing clustering analysis on the multiple data subsets based on data contained in the database.

16. The apparatus of claim 13 wherein the means for choosing comprises means for clustering the multiple number of candidate clustering starting points using each starting point as an interim starting point for clustering said starting points.

17. The apparatus of claim 16 wherein the means for choosing comprises means for determining a best refined candidate clustering starting point from an intermediate clustering of the data sample solutions based upon a distance from the data points of said multiple solutions to a set of intermediate clustering solutions.

18. A computer-readable medium having computer-executable instructions for performing steps for evaluating a database wherein the database has a data set to be evaluated, and wherein the data set is comprised of a plurality of records, comprising the steps of:
   a) obtaining a multiple number of data subsets comprising a plurality of records from the data set,
   b) performing clustering analysis on the data records that make up each of the subsets to provide a multiple number of candidate clustering starting points;
   c) choosing one of the multiple candidate clustering starting points to be used in clustering the data set to be evaluated; and
   d) using the chosen starting point to perform clustering analysis on the data set to be evaluated.

19. A method for evaluating data in a database that is stored on a storage medium, wherein the database has a data set to be evaluated, and wherein the data set is comprised of a plurality of records, comprising the steps of:
   a) obtaining a multiple number of data subsets comprising a plurality of records from the data set,
   b) performing clustering analysis on the data records that make up each of the subsets to provide a multiple number of candidate clustering starting points;
   c) choosing a clustering starting point based on the multiple candidate clustering starting points to be used in clustering the data set to be evaluated; and
   d) using the chosen starting point to perform clustering analysis on the data set to be evaluated.

20. The method of claim 19 wherein each of the multiple number of candidate clustering starting points is used as an intermediate starting point for clustering the candidate starting points and wherein a resulting solution of said clustering of candidate starting points is used as a refined clustering starting point.

21. The method of claim 20 wherein the refined clustering starting point is chosen by determining a distance from multiple intermediate clustering solutions and a set of data points made up of the candidate clustering starting points.

22. The method of claim 21 wherein the refined clustering starting point is an optimum solution to the clustering of the multiple candidate clustering starting points wherein optimum is based on said distance.

23. The method of claim 1 wherein the step of choosing one of the multiple candidate clustering starting points is performed by:

a) choosing a candidate clustering starting point;

b) using the chosen candidate clustering starting point to perform an interim clustering analysis on an interim data set;

c) determining the quality of the cluster solution resulting from the interim clustering analysis;

d) repeating steps a) through c) until all candidate clustering starting points have been used in interim clustering analysis; and    e) selecting the candidate starting point which yielded the best quality cluster solution as a refined starting point for performing clustering analysis on the data set to be evaluated.

24. The method of claim 23 wherein the interim data set is a plurality of unchosen candidate starting points.

25. The method of claim 23 wherein the interim data set is a plurality of data records that make up the data subsets.

26. The method of claim 23 wherein the step of determining the quality of the interim clustering analysis if performed by calculating a degree of fit of the chosen candidate starting point with the interim data set.

\* \* \* \* \*